Sept. 1, 1931.  E. H. ARNOLD  1,821,782
METAL WHEEL AND METHOD OF MAKING THE SAME
Filed Dec. 9, 1925
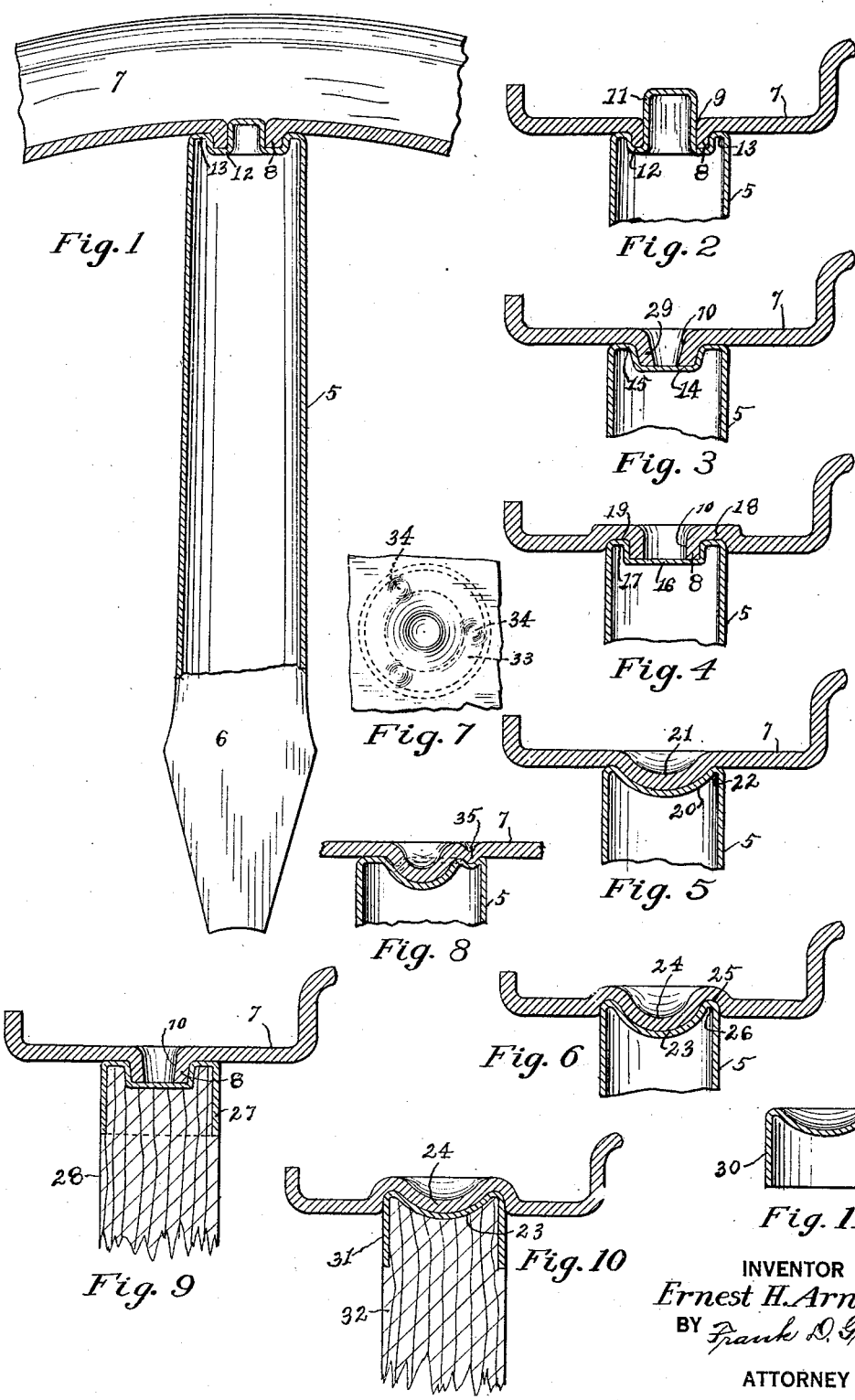
INVENTOR
Ernest H. Arnold
BY Frank D. Gray
ATTORNEY Patented Sept. 1, 1931

1,821,782

UNITED STATES PATENT OFFICE

ERNEST H. ARNOLD, OF CLEVELAND, OHIO

METAL WHEEL AND METHOD OF MAKING THE SAME

Application filed December 9, 1925. Serial No. 74,312.

This invention relates to metal wheels and the method of making the same, and more particularly to wheels for motor vehicles. The special features of the improvement are concerned with the mode of attachment of the spokes to the wheel rim. While the method of such attachment will be used in attaching the outer ends of tubular metallic spokes to metal rims or felloes, it will be evident from observation of the structure herein illustrated, that it may as readily be used in securing the closed end of a tubular metal portion, to a metal rim.

My invention is intended to be used especially where spokes are to be united to wheel rims or felloe bands through the intermediacy of a closed outer end of a tubular part whether the latter may be an integral part of a hollow metal spoke, or a tubular metal portion that may rest against the rim.

The objects of my improved device and method are therefore to provide the outer ends of spokes with a dished-end which shall be adapted to receive therein the inturned flange about a wheel rim aperture. This will often take the form, also, of providing such a depression receiving the inturned-protuberance from the rim, though no aperture be provided in the latter instance.

Special objects of my improvements are to provide depressions in the outer ends of spokes to receive inner protuberances seating in said depressions and thereby prevent lateral displacement of the spoke ends relative to the rim. This involves also the further object of no longer rendering essential the provision of a central tenon for entering the rim aperture. This tenon structure used to some extent in current modes of manufacture, adds unnecessarily to the expense of manufacture, and may by my improvement be dispensed with altogether.

With these and other objects in view, my invention consists of the method of operation, the disclosed structure and relative arrangement of parts described in this specification, recited in the appended claims and illustrated in the accompanying drawings, in which:—

Figure 1 is a side view of a spoke shown connected with a wheel rim, partly in elevation and partly in vertical central section in the plane of the rim;

Figure 2 is a transverse section of the outer end of a spoke and the rim to which it is attached, the same being a slight modification of the form in Fig. 1;

Figure 3 is a similar view of such spoke-rim connection of another modification;

Figure 4 is a similar view of a further modification;

Figure 5 is a similar view of a modification in which the rim is not apertured but has a depression to engage the spoke end;

Figure 6 is a similar view of a modification corresponding to that in Fig. 4;

Figure 7 is a plan view of the bottom wall of a rim shown in the axis of a spoke;

Figure 8 is a vertical section of spoke end and rim shown as a further modification;

Figure 9 is a vertical section of a cap element fitted to a rim part, the cap shown as supported upon the end of a wooden spoke;

Figure 10 is a similar view of a modified attachment somewhat similar to that shown in Fig. 6, and Figure 11 is a central, vertical section of a cap corresponding to the general form of the metal spoke end shown in Fig. 5.

Referring to the drawings the numeral 5 is employed to designate a unitary spoke, hollow and formed of sheet metal, the inner end 6 being wedge-shaped to be received by the hub structure and the outer end having a closed end designed to be interlocked with the rim 7 of the wheel, usually about an aperture 9 or 10 in said rim. The form of apertured rim which is quite suitable for cooperation with my improved spoke involves an inturned flange 8 about the aperture, which flange may be bent squarely inward, as in Figs. 1, 2 and 4, or may be bent inward obliquely, as at 29 in Fig. 3, where the flanged aperture develops a frusto-conical protuberance for engaging the spoke.

The hollow but closed-end spokes here shown, provide an annular depression 12 to receive the flange 8, the central portion of the spoke end being again outwardly forced to provide the hollow tenon 11 centering in the aperture 9. This tenon member may be long enough to permit flattening on the outer face of the rim for securing the parts together, or the tenon may be reduced in length as in Fig. 1, to merely seat in the aperture.

My special improvement does not however concern the tenon structure, but rather applies to means for readily securing the parts together without this protruding tenon, which has caused some difficulty in the past. This improvement may be perfected by forming the central portion of the spoke end as a unitary central depression 14, as shown in Fig. 3, or 16, as shown in Fig. 4. The annular upstanding hollow portions are designated in these views as 15 and 17, respectively. Where the tenon 11 is used, the outer enclosing annular depression is designated as 13, as shown in Figs. 1 and 2.

In the form shown in Fig. 4, also, the metal stock of the rim 7 is bent outwardly and annularly at 18 about the aperture to form an annular raised portion beyond the general outer surface of the rim, thus providing an annular depression 19 on the corresponding inner face of the rim or felloe band corresponding to the annular protuberant portion 18 to receive the annular portion 17 of the spoke.

It will be readily understood that the arrangement of the hollow depression 14 or 16 need not be at all confined to a hollow metal spoke for its attachment to the rim, but that the same structure in design may be employed for attaching any closed end tubular portion to such a rim.

The forms so far described are designed primarily for attachment of closed-end spokes to apertured rims. But my improved form of spokes may be attached as well to imperforate rims as will now be explained. In Fig. 5, the rim is shown having an inwardly extending cup-shaped protuberance 21 which is adapted to seat in a cup socket 20 of the hollow metal spoke of that view, said cup socket in its formation, providing the annular upstanding angular portion 22.

In Fig. 6, is shown the cup-shaped rim structure 24 surrounded by the outwardly projecting annular raised portion beyond the general outer level of the rim and resulting in the inner annular depression 25 into which the annular edge 26 of the spoke fits neatly, as shown, the cup 24 seating in the cup 23 of the spoke. This form may also be used with any closed end tubular portion of metal.

Figs. 7 and 8 show a still further modification which gives a very secure fitting of the cup shaped protuberance upon the outer closed spoke end. Here the inwardly-cupped portion of the rim may be plainly forced inward as in Fig. 5, or with the raised annular structure of Fig. 6, but in both these instances the annular groove or hollow depression 33 will be provided with one or more inwardly-pressed and spaced dents 34 serving to more positively secure the spoke against relative rotative movement in relation to the rim 7. It is evident that these indentations 34 may also be applied to both the rim material and the spoke in the structure shown in Figs. 2, 3, 4, and 9, as well as in the structure of Figs. 7 and 8. For convenience of description, the protuberances of the rim material which are formed by the indentations 34 are designated 35 in Fig. 8.

The spoke construction as illustrated in the forms thus far described as to their attachment to the rim, has been described and shown as hollow metal, and has also been here described as seamless, but it is clear that the closed end of a hollow spoke some portions of which may be seamed or welded, may also be secured to the rim in a manner somewhat similar to that shown in these views. It is also clear that these types of rim-spoke connections may be used with a closed end tubular metal portion secured in any desired manner to the end of any type of spoke. In Figs. 9 and 10, wooden spokes 28 or 32 are shown tipped with a cap 27, as before described, or with the cap 31 of Fig. 10.

In all these forms, save those in Figs. 1 and 2, it is my purpose to secure closed end spokes to wheel rims either with or without rim apertures, and in each case, without using protruding tenons 11 for entering the said apertures. This improvement in my tenonless closed end spoke serves both to greatly reduce the cost of the securing means between rim and spokes, and to make easier the operation of assembling the several spokes in the wheel, since said operation does not require inward lengthwise movement of the spoke to permit entry of the tenon into the aperture before solidly driving the spokes into the final position.

My present improvement in wheels and the method of making them is illustrated by including the use of my seamless, integral closed-end spoke, the general method of making which is illustrated in my former pending application Ser. No. 38,713, filed June 22, 1925, for "metal wheels and their manufacture", but the present application is especially concerned with the attachment of the outer ends of the spokes to the rims, and the attachment of closed end metal spokes to the rims which to my knowledge is novel, because a closed-end, seamless metal spoke is itself novel, so far as I am aware.

As explained in my former application, above referred to, these closed-end seamless metal spokes are shaped from a flat sheet metal blank by my novel method, so that the outer ends of the spokes are closed, a feature which is of great importance in the method of securing the spokes to the rim.

In the various views illustrating metal spokes—Figs. 3 to 8, the outer ends of the spokes are depressed to form some kind of socket or seat in which a protuberance projecting inward from the rim—a flanged aperture as in Figs. 3 or 4, or imperforate protuberance, as in Figs. 5, 6, 7 and 8, is to rest, thereby locking the spokes in position against the rim.

In Figs. 9 to 11, inclusive, the closed end tubular metal portions 27, 30 and 31, are all formed with a seat centrally thereof for receiving therein the protuberance, imperforate or apertured, of the rim, to secure the parts together, in no case providing an outer-extending tenon for entering an aperture in the rim part or felloe band.

Having thus described my invention, what I claim, and desire to secure by Letters Patent, is—

1. In a vehicle wheel, the combination with a rim having a protuberance extending inwardly therefrom and an annular depression surrounding said protuberance, of a spoke having a closed ended tubular metal portion having a depression in said end and an annular raised portion about said depression, whereby the latter may receive said protuberance therein and the raised annular portion rest in the said annular depression of the rim to secure the spoke against lateral displacement.

2. In a vehicle wheel, the combination with a rim provided with a protuberance inwardly extending therefrom, and an outwardly-projecting annulus concentric with said protuberance extending above the outer level of the rim and forming a corresponding annular groove on the inner side of the rim, of a spoke having a closed ended tubular metal portion having a depression in said end and an annular raised portion about said depression resting in said groove of the rim to hold the spoke against lateral displacement.

3. In a vehicle wheel, the combination with a metallic rim provided with a series of spaced inwardly-projecting protuberances, and outwardly-projecting annuli concentric with said protuberances and forming corresponding inner grooves thereabout, of a series of spokes each having an outer closed-end tubular metal portion having a central depression for coordinating with and receiving one of said protuberances therein, and an annular raised portion integral with said closed end portion and resting in the groove of the rim and about said protuberance to hold the spoke end against lateral displacement relative to the rim.

In testimony whereof I hereunto affix my signature.

ERNEST H. ARNOLD.